April 3, 1962  E. H. BROWN  3,028,217
TRICALCIUM DIAMMONIUM PYROPHOSPHATE
Filed June 3, 1959

```
        VITREOUS
     CALCIUM METAPHOSPHATE
              │        WATER
              │         │
              ▼         ▼
       ┌──────────────────────┐
       │     EXTRACTION       │
       │  AND PHASE SEPARATION│
       └──────────────────────┘
         │              │
         │              │
   SUPERNATANT          │
◀──AQUEOUS PHASE        │
                   VISCOUS PHASE
                        │
                        ▼
       ┌──────────────────────┐
       │   CRYSTALLIZATION OF │
       │ Ca₃H₂(P₂O₇)₂ · 4H₂O  │
       └──────────────────────┘
                 │
             CRYSTALLINE
               MASS
                 │           WATER
                 ▼            │
       ┌──────────────────────┐
       │      WASHING         │
       └──────────────────────┘
           │          │
           │       CRYSTALS        AMMONIUM
◀── WASHINGS                       HYDROXIDE
                      │              │
                      ▼              ▼
       ┌──────────────────────┐
       │   CRYSTALLIZATION OF │
       │     TRI-CALCIUM      │
       │ DIAMMONIUM PYROPHOSPHATE│
       └──────────────────────┘
           │            │
        MOTHER          │
◀──    LIQUOR           ▼
                   CRYSTALLINE
                    PRODUCT
```

Earl H. Brown INVENTOR.
BY Bentley C. Morrow
attorney

United States Patent Office 3,028,217
Patented Apr. 3, 1962

3,028,217
TRICALCIUM DIAMMONIUM PYROPHOSPHATE
Earl H. Brown, Sheffield, Ala., assignor to Tennessee Valley Authority, a corporation of the United States
Filed June 3, 1959, Ser. No. 817,956
2 Claims. (Cl. 23—107)
(Granted under Title 35, U.S. Code (1952), sec. 266)

The invention herein described may be manufactured and used by or for the Government for governmental purposes without payment to me of any royalty thereon.

This invention is a new pyrophosphate and a process for its production.

Principal objects of the invention are to provide a new material suitable for fertilizer and other uses and to provide a process for its manufacture.

The new material is tricalcium diammonium pyrophosphate. It may be produced by digesting crystalline tricalcium dihydrogen pyrophosphate in an excess of ammonia. A process for the production of tricalcium dihydrogen pyrophosphate is shown and described in my copending application Serial No. 817,952, filed June 3, 1959, now abandoned.

I prefer to produce tricalcium diammonium pyrophosphate from vitreous calcium metaphosphate by a process which comprises soaking with water in a reaction vessel finely divided vitreous calcium metaphosphate to promote hydrolysis thereof, producing an extract consisting of two phases, namely, (1) a heavy substantially water-insoluble viscous phase and (2) a supernatant aqueous solution of water-soluble degradation products of vitreous calcium metaphosphate; continuously separating the phases; continuously withdrawing the supernatant solution during extraction; separating the viscous phase from residual supernatant solution; holding the separated viscous phase until it becomes crystalline; washing orthophosphate from the resulting crystalline material; and digesting the resulting crystalline tricalcium dihydrogen pyrophosphate with an excess, preferably about 6 times the theoretical quantity, of concentrated ammonium hydroxide. The crystalline product of the digestion is tricalcium diammonium pyrophosphate, which normally crystallizes with 2 molecules of water present.

The attached drawing is a flowsheet illustrating diagrammatically a method for the preparation of this new material from calcium metaphosphate.

The preferred starting material is ordinary vitreous calcium metaphosphate. Either chemically pure or fertilizer-grade material is satisfactory. This calcium metaphosphate is ground to a degree of fineness which will depend upon the method of extraction used. For example, simple percolation of water through a bed of crushed calcium metaphosphate at room temperature is one satisfactory method for carrying out extraction.

When this method is used, the calcium metaphosphate preferably is in particles from −20 to +60 mesh in size. Inclusion of much material fine enough to pass a 60-mesh screen will cause a bed of calcium metaphosphate particles to mat together, and the resulting mass does not have enough voids to permit free passage of liquid.

Preferably, the extraction may be carried out with use of a stirring device arranged to keep the particles of calcium metaphosphate in motion in extraction water. When extraction is conducted in this manner the calcium metaphosphate may be of smaller particle size, since the material does not adhere while in motion in water, and the advantage of greater surface contact with extraction water per pound of calcium metaphosphate is gained.

I have found that the extract consists of two phases when pure calcium metaphosphate is used as starting material: (1) a heavy viscous phase immiscible with water, and (2) a supernatant dilute aqueous solution of degradation products of calcium metaphosphate. The supernatant aqueous phase is formed in much greater volume than the heavy viscous phase, but it contains relatively little phosphate. This supernatant solution must be drawn off continuously as it is formed if any reasonable degree of purity of the viscous-phase material is to be attained, because the aqueous solution may become sufficiently concentrated in shorter chain calcium metaphosphate polymers to cause the materials in the two phases to become partially miscible in each other.

When the supernatant solution is continuously drawn off, the viscous phase is a sirupy mixture of hydrated polymers of calcium metaphosphate containing from 30 to 60 percent of $Ca(PO_3)_2$, polymerized in relatively long-chain molecules.

When extraction is complete, the heavy viscous phase is separated from any residual supernatant solution. The separated viscous phase is then held in a closed vessel until crystallization occurs. On standing, this material first becomes a gel and then a mass of crystals.

The resulting crystalline material is tricalcium dihydrogen pyrophosphate, $Ca_3H_2(P_2O_7)_2 \cdot 4H_2O$, mixed with some orthophosphate. The crystals are washed with water, which removes orthophosphate. Tricalcium dihydrogen pyrophosphate is then treated with an excess of ammonium hydroxide in high concentration. Reaction between the tricalcium dihydrogen pyrophosphate crystals and concentrated ammonia goes well at room temperature. A crystalline product, tricalcium diammonium pyrophosphate, $Ca_3(NH_4)_2(P_2O_7)_2 \cdot 6H_2O$, is formed.

When fertilizer-grade vitreous calcium metaphosphate is used as starting material, there is no separation of phases in the aqueous extract produced. Apparently silica present in the fertilizer-grade material causes the degradation reaction to proceed faster than the phases will separate under the influence of gravity. The entire extract is a single viscous phase. It is treated exactly as described above for the viscous phase obtained from pure calcium metaphosphate. The end result is the same except that the product contains impurities derived from the impure starting material.

Example

Vitreous pure calcium metaphosphate was crushed and screened to separate a fraction of size to pass a standard 20-mesh screen and be retained upon a 60-mesh screen. About 50 grams of the sized calcium metaphosphate was introduced into an extraction vessel. Distilled water was added to the extraction vessel dropwise while the vessel and contents were maintained at a temperature of about 50° C. An extract consisting of two phases was formed. These phases were: (1) a dilute aqueous solution of short-chain degradation products of calcium metaphosphate, and (2) a heavy viscous phase which was substantially immiscible with water or with the dilute aqueous solution. The phases were separated as formed by difference in specific gravity. The supernatant aqueous phase was continuously drawn off during extraction.

The viscous phase was then separated from residual supernatant aqueous solution and was placed in a closed vessel and there held until it became a crystalline mass, consisting essentially of tricalcium dihydrogen pyrophosphate in admixture with a small proportion of orthophosphate. The mass was then washed with sufficient water to remove orthophosphate.

The resulting crystals of tricalcium dihydrogen pyrophosphate were then treated with an excess (about 6 times the theoretical quantity) of concentrated ammonium hydroxide at about 20° to 35° C. The resulting mixture was held in a closed vessel until reaction was complete.

The process just described was repeated twice. In each case the crystalline product produced was tricalcium diammonium pyrophosphate having the compositions shown by the following table.

| Run | Composition, percent | | | | Mole ratio | | | |
|---|---|---|---|---|---|---|---|---|
| | CaO | $P_2O_5$ | $NH_3$ | $H_2O$ (diff.) | CaO | $P_2O_5$ | $NH_3$ | $H_2O$ |
| 1 | 27.42 | 46.34 | 5.5 | 20.74 | 1.50 | 1.0 | 0.99 | 3.53 |
| 2 | 27.59 | 46.61 | 5.3 | 20.50 | 1.50 | 1.0 | 0.95 | 3.48 |
| 3 | 27.26 | 46.38 | 5.5 | 20.86 | 1.49 | 1.0 | 0.99 | 3.54 |

These products had the same characteristic optical properties and X-ray diffraction pattern.

I claim as my invention:

1. A process for the production of tricalcium diammonium pyrophosphate which comprises the steps of soaking with water in a reaction vessel finely divided vitreous calcium metaphosphate to promote hydrolysis thereof whereby a mixture of hydrated polymers of relatively long-chain molecules of calcium metaphosphate containing from about 30 to about 60 percent of $Ca(PO_3)_2$ is formed, producing an extract from said water-soaked calcium metaphosphate consisting of two phases, namely, (1) a heavy, substantially water-insoluble viscous phase and (2) a supernatant aqueous solution of water-soluble degradation product of vitreous calcium metaphosphate; continuously separating said phases; continuously withdrawing the supernatant solution from said reaction vessel; separating said viscous phase from the residual supernatant solution; holding said separated viscous phase until it becomes crystalline; washing orthophosphate from the resulting crystalline material; digesting the resulting crystalline tricalcium dihydrogen pyrophosphate with an excess, of the theoretical quantity, of concentrated ammonium hydroxide; and withdrawing the crystalline product from said digestion step as tricalcium diammonium pyrophosphate having the formula $$Ca_3(NH_4)_2(P_2O_7)_2 \cdot 6H_2O$$

2. The process of claim 1 wherein the step of digesting the crystalline tricalcium dihydrogen pyrophosphate with an excess of concentrated ammonium hydroxide is carried out at a temperature of about 20° to 35° C.

References Cited in the file of this patent

Journal of Physical Chemistry, Brown et al., "Crystalline Intermediates . . . Calcium Polymetaphosphate," vol. 61, July-December 1957, pages 1669 and 1670.